(12) United States Patent
Miao et al.

(10) Patent No.: US 7,620,108 B2
(45) Date of Patent: Nov. 17, 2009

(54) INTEGRATED SPATIAL-TEMPORAL PREDICTION

(75) Inventors: Zhourong Miao, San Jose, CA (US); James J. Carrig, San Jose, CA (US); Marco Paniconi, Campbell, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 564 days.

(21) Appl. No.: 11/228,599

(22) Filed: Sep. 16, 2005

(65) Prior Publication Data

US 2007/0064797 A1    Mar. 22, 2007

(51) Int. Cl.
*H04N 7/18* (2006.01)
(52) U.S. Cl. .................... 375/240.18; 375/240.2
(58) Field of Classification Search ..................
375/240.11–240.26
See application file for complete search history.

(56) References Cited

U.S. PATENT DOCUMENTS

| | | | |
|---|---|---|---|
| 4,922,341 A | 5/1990 | Strobach | |
| 5,047,850 A | 9/1991 | Ishii et al. | |
| 5,654,771 A | 8/1997 | Tekalp | |
| 5,818,536 A | 10/1998 | Morris et al. | |
| 5,872,866 A * | 2/1999 | Strongin et al. | 382/233 |
| 5,974,188 A | 10/1999 | Benthal | |
| 6,178,205 B1 | 1/2001 | Cheung et al. | |
| 6,208,692 B1 | 3/2001 | Song et al. | |
| 6,212,235 B1 | 4/2001 | Nieweglowski et al. | |
| 6,466,624 B1 * | 10/2002 | Fogg | 375/240.27 |
| 6,480,615 B1 | 11/2002 | Sun et al. | |
| 6,590,934 B1 * | 7/2003 | Kim | 375/240 |
| 6,591,015 B1 | 7/2003 | Yasunari et al. | |
| 6,608,865 B1 | 8/2003 | Itoh | |
| 6,690,729 B2 | 2/2004 | Hayashi | |
| 6,754,269 B1 | 6/2004 | Yamaguchi et al. | |
| 6,765,965 B1 | 7/2004 | Hanami et al. | |
| 6,782,054 B2 * | 8/2004 | Bellers | 375/240.27 |
| 6,864,994 B1 | 3/2005 | Harrington | |
| 2004/0057517 A1 | 3/2004 | Wells | |
| 2004/0062307 A1 | 4/2004 | Hallapuro et al. | |
| 2004/0131267 A1 | 7/2004 | Adiletta et al. | |

(Continued)

FOREIGN PATENT DOCUMENTS

WO    WO 00/16563 A1    3/2000

(Continued)

OTHER PUBLICATIONS

Leymarie et al, Tracking Deformable Objects in the Plane Using an Active Contour Model, IEEE Trans. on Pattern Analysis and Mach. Intel., vol. 15 No. 6, Jun. 1993, pp. 617-634.

(Continued)

*Primary Examiner*—Andy S Rao
(74) *Attorney, Agent, or Firm*—Blakely, Sokoloff, Taylor & Zafman LLP

(57) ABSTRACT

A method of generating a spatial prediction of a target block of pixels in a target image includes generating a spatial vector for a target block of pixels, using the spatial vector to construct a spatial reference block, and using the spatial reference block to generate the spatial prediction of the target block.

9 Claims, 5 Drawing Sheets

U.S. PATENT DOCUMENTS

2004/0233991 A1    11/2004    Sugimoto et al.
2005/0100092 A1    5/2005    Sekiguchi et al.
2005/0135483 A1    6/2005    Nair

FOREIGN PATENT DOCUMENTS

WO    WO 01/78402 A1    10/2001
WO    WO 02/37859 A2    5/2002
WO    WO 2004/047454 A1    6/2004
WO    WO 2005/069629 A1    7/2005

OTHER PUBLICATIONS

Reshef et al, Low Bit-Rate Video Coding Using Iterave Affine Motion Estimation and Quadtree Segmentation, Proc. Int'l Conf. on Dig. Signal Processing, Jun. 1995 pp. 427-431.

Chang et al, Simultaneous Motion Estimation and Segmentation, IEEE Transactions on Image Processing, vol. 6 No. 9, Sep. 1997, pp. 1326-1333.

Zhang et al, Image Sequence Segmentation Using 3-D Structure Tensor and Curve Evolution, IEEE Trans. on Circuits and Sys. For Video Tech., vol. 11 No. 5, May 2001, pp. 629-640.

Orchard et al, Overlapped Block Motion Compensation: An Estimation-Theoretic Approach, IEEE Transactions on Image Processing, vol. 3 No. 5, Sep. 1994, pp. 693-699.

Du et al, Two Dimensional Hierarchical Mesh Based Video Compression Techniques, 6th Int'l Symposium on DSP for Communication Systems, 2002, Sydney Australia, pp. 247-252.

* cited by examiner

INTEGRATED SPATIAL-TEMPORAL PREDICTION

FIELD OF INVENTION

The invention is related to the field of video compression.

BACKGROUND

Sequential video images are generally encoded by video compression processes in one of two ways. One way is for each image in the sequence to be encoded by itself, as a stand alone or still image. This process is referred to as an intra-encoding compression process, because the encoding algorithm operates only on features within the target image. Another way of performing video compression, called temporal prediction encoding, is for a given image to be encoded by predicting the motion of a target image based on another, previously encoded reference image. This process is also referred to as inter-encoding, because the prediction is generated from an inter-relationship between a target image and a reference image.

During the temporal prediction encoding process, the target image and the reference image are divided into blocks. If a block in the target image is similar to a block in a reference image, then the spatial displacement, or motion, of the block from its location in the reference image to its location in the target image is determined. This displacement information is stored in a motion vector which associates the reference block with the target block. The encoded image data from the reference block provides a prediction of the image data for the target block.

Although image data for most of the target blocks in the target image can be predicted by the temporal predictive method, some of the target blocks may not be predicted very well by this method. For example, a block in the target image may not be similar to a block in the reference image. In this case, the intra-encoding process is used to encode the target block, without relying on any of the reference images.

FIG. 1 shows an example of a target image that is encoded using both temporal prediction (or inter-encoding) and intra-encoding methods. A target block 125 in target image 120 is matched to a similar block 115 in reference image 110 using motion vector 130. The image data for the target block 125 is then predicted during a decoding process from the image data in the target block 115. The target block 125 is therefore efficiently encoded by the temporal prediction method.

However, target block 140 cannot be encoded by the temporal prediction method, because it has no counterpart in reference image 110. Target block 140 should therefore be encoded by the intra-block encoding method.

Some blocks are encoded better with a temporal prediction method, and others are encoded better with an intra-encoding method. When using both temporal prediction and intra-encoding methods to encode an image, the encoder has to decide whether to use a temporal prediction or an intra-encoding method for each block. However, since the traditional temporal prediction and intra-encoding methods produce different results, their respective encoded blocks are too different to compare when making this decision.

For example, when encoding a target block, typical video compression algorithms use the decision system 200 shown in FIG. 2 to decide whether to apply a temporal prediction or an intra-encoding method for that block. Target block 210 is encoded by temporal prediction logic device 220, which applies the temporal prediction encoding method. The logic device 220 determines a motion vector 230 to map encoded image data from a reference block to the target block 210. The temporal prediction logic 220 also calculates a prediction error 240 between the prediction of the image data for the target block, and the actual image data for the target block. The bit cost estimation logic device 250 estimates the bit cost for the motion vector 230, as well as the bit cost of the prediction error 240, to produce a bit cost for the temporal encoding of target block 210.

The decision system 200 also encodes the target block 210 using an intra-encoding process. The intra-encoding logic device 260 applies a discrete cosine transform (DCT) to original pixel values in the target block, to produce a set of DCT coefficients 270. Intra-block bit cost estimation logic device 280 estimates the bit cost of encoding the DCT coefficients. Bit cost selection logic device 290 compares the bit costs produced by logic devices 250 and 280, and selects the encoding process that has the lower bit cost.

As shown in FIG. 2, the temporal prediction process produces a motion vector and a prediction error, and the intra-encoding method produces a set of DCT coefficients. In order to compare the two, the decision system has to perform two encoding processes and then estimate the bit cost of the encoded results from each process before it can identify the process that produces a result with a lower bit cost. A problem, therefore, is that the decision system is unable to determine which particular encoding process provides a better cost benefit without estimating the bit costs of the entire results of both processes.

SUMMARY

A method of generating a spatial prediction of a target block of pixels in a target includes generating a spatial vector for a target block of pixels, using the spatial vector to construct a spatial reference block, and using the spatial reference block to generate the spatial prediction of the target block.

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. For example, skilled artisans will understand that the terms field, frame, image, or picture that are used to describe the various embodiments are generally interchangeable as used with reference to video data.

A spatial prediction method replaces traditional methods of intra-encoding by creating a spatial vector and a spatial prediction error. The spatial vector has a structure that is similar to the structure of a motion vector. As a result, the cost of encoding the spatial vector is similar to the cost of encoding the motion vector. Therefore, the spatial prediction method can be integrated with a temporal prediction method to produce an Integrated Spatial-Temporal Prediction Encoding (ISTPE) method.

To integrate the temporal and spatial prediction methods, an error-based selection process chooses which method to apply to a particular target block by comparing the prediction errors of the two methods. The selection process generates prediction results for the temporal prediction method, including a motion vector and a temporal prediction error. The selection process also generates prediction results for the spatial prediction method, including a spatial vector and a spatial prediction error. Because the encoding cost of the motion vector is similar to that of the spatial vector, the selection process decides which encoding method to use by comparing the spatial and temporal prediction errors. The target block is encoded with the prediction method that has the smaller prediction error. The selection is made without estimating the bit costs of the encoded results of the spatial and temporal prediction methods.

Figure 1:
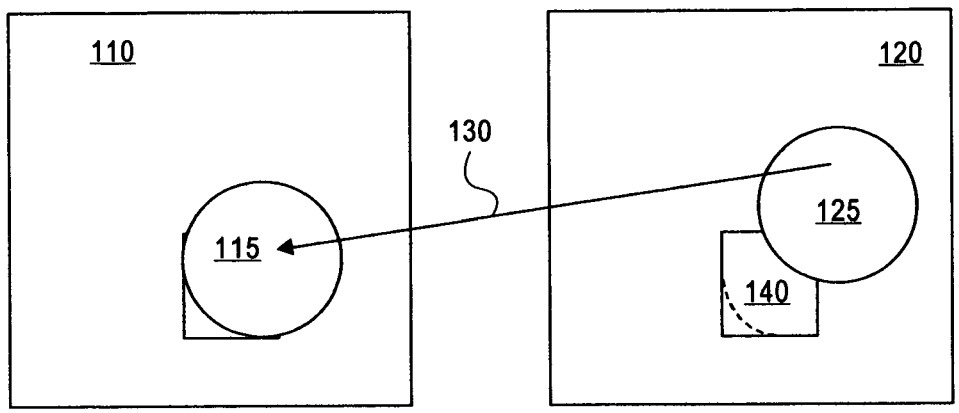
FIG. 1 shows an example of a target image that is encoded using both temporal prediction (or inter-encoding) and intra-encoding methods.
Figure 2:
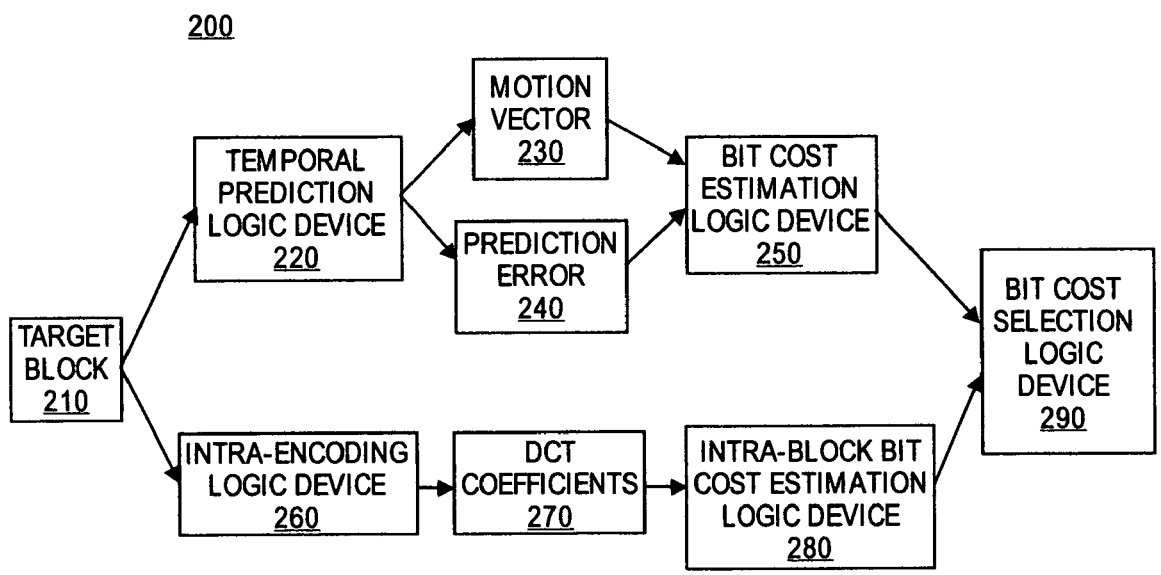
FIG. 2 shows an example of a decision system to decide whether to apply a temporal prediction or an intra-encoding method for a block.
Figure 3:
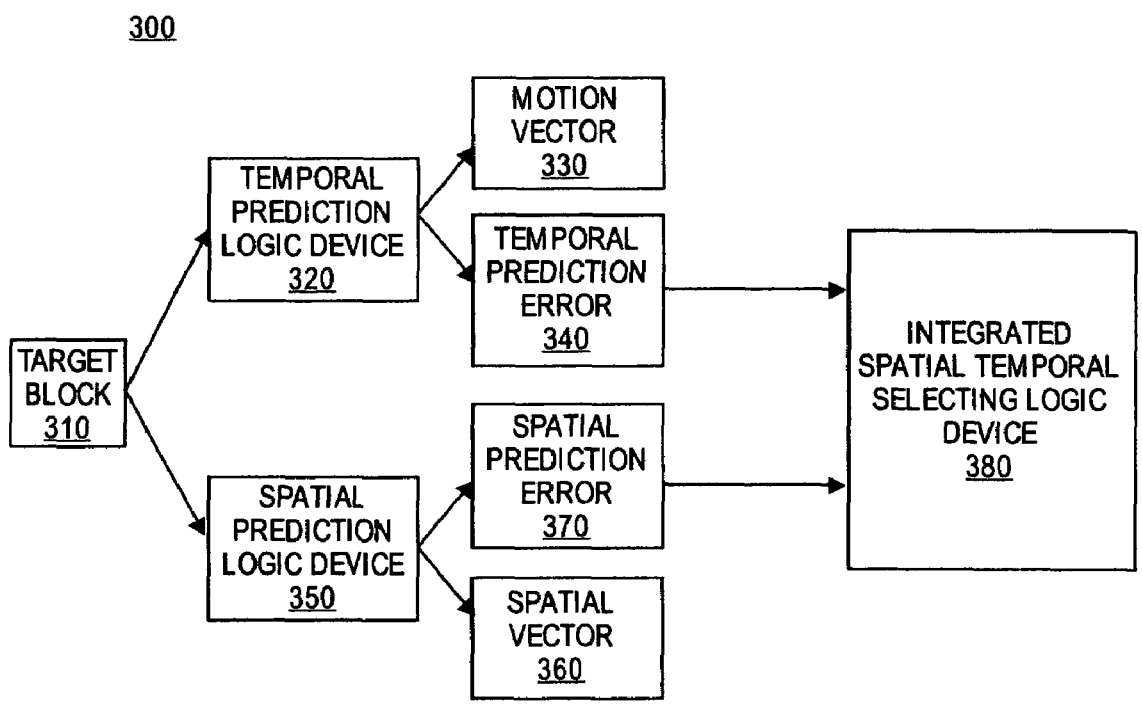
FIG. 3 shows an example of an integrated spatial-temporal prediction encoding system.

Because the temporal and spatial prediction methods have similar prediction and encoding stages, and produce similar outputs, an encoder that performs the integrated method has less complexity and better accuracy in selecting the appropriate encoding method. An example of an integrated spatial-temporal prediction encoding system 300 is shown in FIG. 3. System 300 determines which prediction method to apply to a target block by making an error-based selection.

The target block 310 is encoded using a temporal prediction process by temporal prediction logic device 320. A motion vector 330 is generated by the logic device 320 to point to a reference block. The logic device 320 predicts the image data for the target block using the encoded image data from the reference block. A temporal prediction error 340, which is the difference between the predicted image data for the target block and the actual image data for the target block, is then calculated by the logic device 320.

The target block 310 is also encoded by spatial prediction logic device 350, which creates a spatial vector 360 for the target block. The logic device 350 constructs a spatial reference block using the spatial vector. The logic device 350 predicts the image data for the target block using the spatial reference block. Then, the logic device 350 calculates the spatial prediction error 370 between the spatially predicted image data and the actual image data.

The temporal prediction error 340 and the spatial prediction error 370 are compared by integrated spatial-temporal selecting logic device 380, which selects the encoding method with the smaller error as the appropriate encoding method to use for the target block 310.

As shown in FIG. 3, the spatial prediction logic device 350 produces outputs, such as a spatial vector 360 and a spatial prediction error 370, that are similar to the outputs of the temporal prediction logic device 320. When choosing between temporal or spatial prediction methods for encoding a target block, the encoder system 300 can decide by directly comparing the prediction errors of the temporal and spatial predictions, without estimating the bit costs of the temporal and spatial predictions. As a result, the complexity of making the decision is reduced. This allows the spatial prediction method to be easily integrated with the temporal prediction method, to provide a system that performs Integrated Spatial Temporal Predictive Encoding (ISTPE).

Furthermore, the prediction errors generated by an ISTPE system can be encoded with non-block based processes. This is in contrast to traditional inter- and intra-encoding methods, which only generate prediction errors for inter-encoded (or temporally predicted) blocks. These conventional prediction errors therefore have to be encoded block by block (e.g., by block based DCT methods). The ISTPE process generates prediction errors for spatially predicted, as well as temporally predicted, target blocks. Thus, the prediction errors produced by both methods can be gathered and encoded using non-block based transforms (e.g., a wavelet transform).

Figure 4:
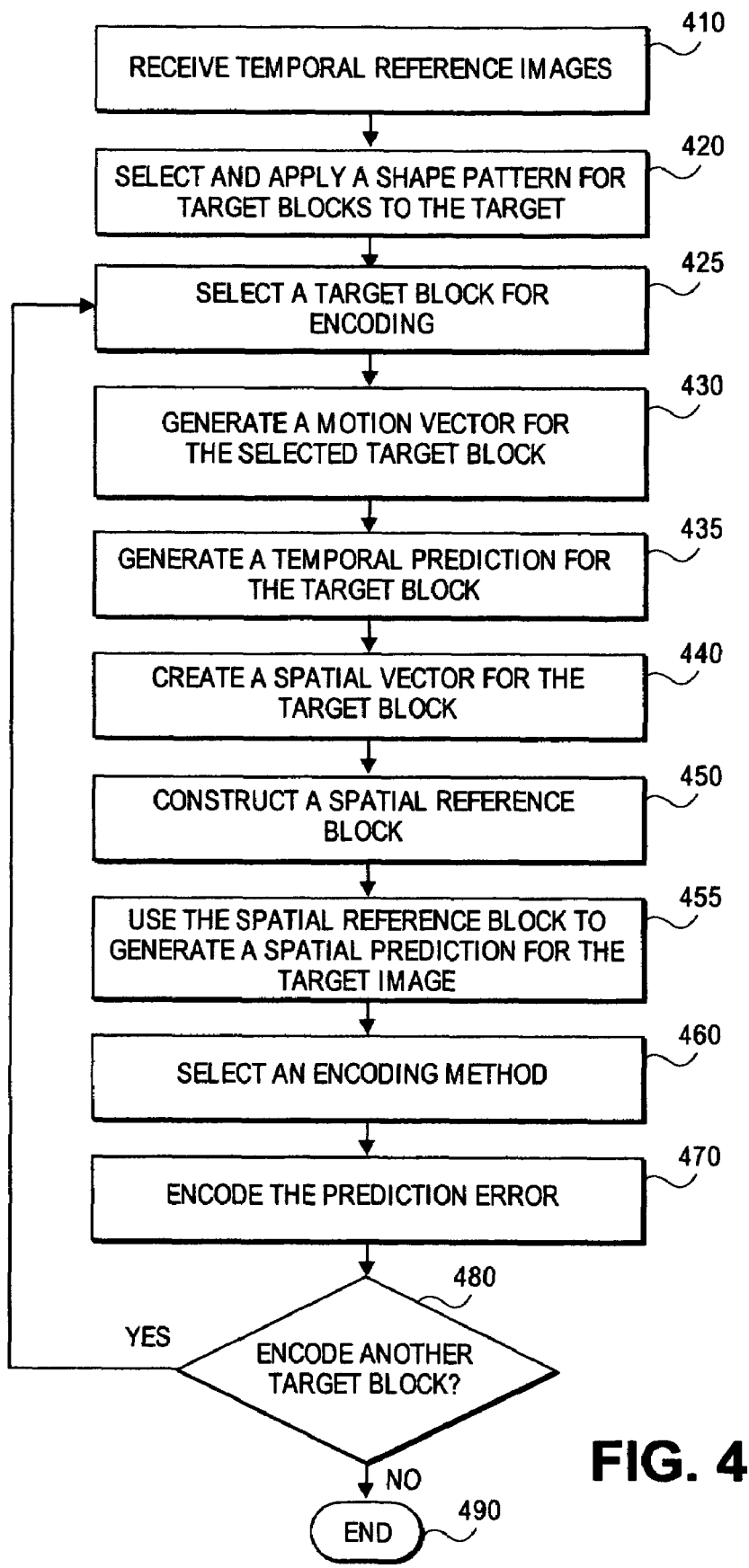
FIG. 4 shows an example of a method for performing Integrated Spatial-Temporal Predictive Encoding (ISTPE).

A method for performing ISTPE for a target image is shown in FIG. 4. At 410, receive temporal reference images for the target image. The temporal reference images, which have already been encoded, can be single or multiple reference images.

At 420, select and apply a shape pattern for target blocks to the target image to be predicted. The shape pattern can be a fixed block pattern (for example, a pattern used in MPEG-1/2) or variable block pattern (for example, a pattern used in MPEG-AVC/H.264). During 420, the selected pattern is applied to the target image to generate a set of blocks (or other shapes), called target blocks. Each target block is the smallest group of pixels in the target image to be predicted together from either a temporal or a spatial reference block, e.g., all the pixels in one target block share the same motion vector or spatial vector.

At 425, one of the target blocks is selected for encoding. At 430, the temporal prediction method is applied to the selected target block to generate a motion vector that points to a reference block. Traditional motion estimation procedures known to those of skill in the art can be used to identify the reference block and determine the motion vector. For example, the motion vector can be calculated from the displacement (or motion) between the target block and the reference block. At 435, the encoded image data in reference block is used to generate a temporal prediction of the image data for the target block.

At 440, the spatial prediction method is applied to the selected target block to create a spatial vector for the target block. The spatial vector is a set of data for creating a coarse version of the target block, called a spatial reference block. At 450, the spatial reference block is constructed using the spatial vector. Different approaches can be used to create the spatial vector and construct the spatial reference block. In one embodiment, a Discrete Cosine Transform Spatial Prediction (DCT-SP) process is used to create the spatial vector and to construct the corresponding spatial reference block. An example of the DCT-SP process is discussed below.

At 455, the spatial reference block is used to generate a spatial prediction of the image data for the target block.

At 460, a selection function selects a prediction method to use for encoding the target block. The selection is made by comparing the prediction errors of the temporal and spatial prediction methods. The temporal prediction error is generated by subtracting the temporal prediction of the pixel values for the block from the actual pixel values of the block. Similarly, the spatial prediction error is generated by subtracting the spatial prediction of the pixel values from the actual values. Generally, the selection function computes a temporal prediction error and a spatial prediction error, compares the two errors, and selects the method with the lower prediction error. In one embodiment, the selection function determines the value of a prediction distortion of the target block for both the temporal prediction and the target prediction, and selects the encoding method having the lower prediction distortion.

An example of a prediction distortion of a block is:

$$D_B = \sum_{x,y \in B} (\hat{v}_{x,y} - v_{x,y})^2, \quad (1)$$

where $x,y \in B$ denotes all the pixels in the block (or shape) B, $v_{x,y}$ is the original pixel value in the target picture, and $\hat{v}_{x,y}$ is the predicted value of that target pixel.

The temporal prediction from 435 can be input to equation (1) to produce a temporal prediction distortion. The spatial prediction from 455 can also be applied to equation (1) to produce a spatial prediction distortion. Thus, equation (1) can be used to generate prediction distortions for the temporal and spatial predictions. The two prediction distortions are then easily compared to select an appropriate encoding method.

Another example of a prediction distortion is the sum of the absolute value of the prediction error:

$$D_B = \sum_{x,y \in B} |\hat{v}_{x,y} - v_{x,y}|. \quad (2)$$

A user can choose equation (1), equation (2), or another function, to be used at 460 to decide whether to use a temporal or a spatial prediction method for the target block.

At 470, the final target block prediction error (from either the spatial or temporal encoding, selected at 460) can be encoded along with the block using the appropriate encoding method. Alternatively, after each target block in the target image is predicted and encoded, the prediction errors for all of the target blocks can be encoded together.

At 480, if another target block in the image needs to be encoded, the process returns to 425, otherwise, the process ends at 490.

Figure 5:
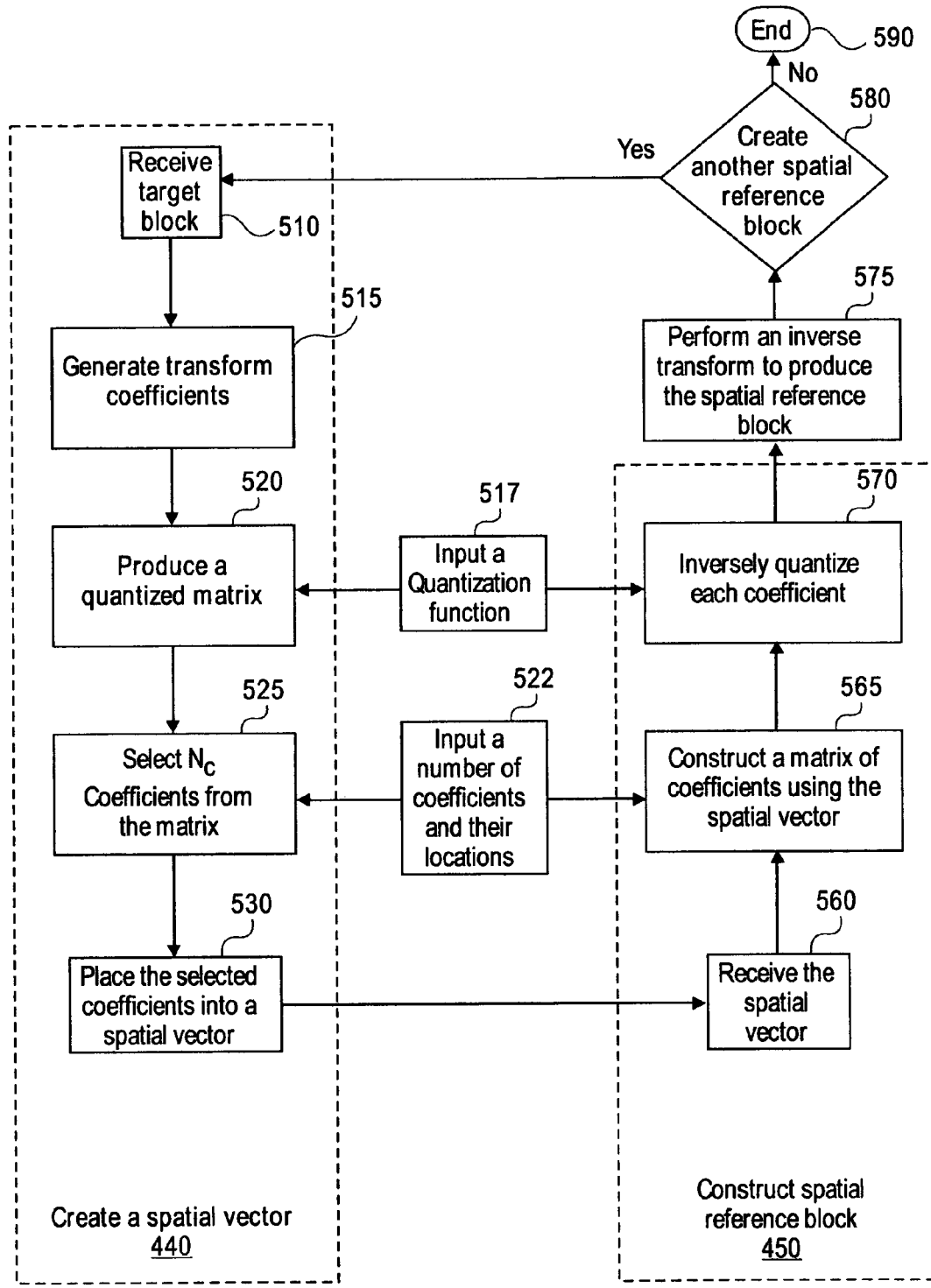
FIG. 5 shows an example of a DCT spatial-prediction process used to perform an embodiment of the ISTPE method.

Referring to 440 and 450 of FIG. 4 in greater detail, an example of a method to create a spatial vector and to construct a spatial reference block is illustrated in FIG. 5. This exemplary method generates the spatial vector and constructs its corresponding spatial reference block using a DCT (Discrete Cosine Transform) block transform.

At 440, a spatial vector is generated by performing the following functions. At 510, a target block in the target image is received. At 515, transform coefficients are generated. For example, let X be a matrix representing the target block, where each element in the matrix is the pixel value in that block. A block transform (e.g., DCT) is performed over matrix X, to obtain a transform coefficient matrix C.

At 517, a quantization function q to quantize the matrix C is input to the method as a control parameter. The value of the quantization function can be defined by a user or set by the encoder. At 520, each coefficient in matrix C is quantized, to produce a quantized matrix C'.

At 522, a number of coefficients $N_c$ to select, and their corresponding matrix locations can be input by a user or set by the encoder as control parameters in some embodiments. Generally, the number of coefficients $N_c$ is chosen such that the number of coefficient elements in the spatial vector is similar to the number of elements in a motion vector. As a result, the encoding efficiency of the two methods can be compared by a function that ignores the encoding costs of the two vectors.

At 525, select the $N_c$ coefficients from their given locations in the coefficient matrix C'. In one embodiment, the process selects $N_c$ coefficients located at the upper-left corner of the coefficient matrix C'.

At 530, create a spatial vector S for this target block using the $N_c$ quantized numbers. This spatial vector can be used to generate the spatial reference block for the corresponding target block.

At 450, a spatial reference block is constructed by first receiving the spatial vector S for a given target block at 560. The spatial vector contains $N_c$ elements. At 565, construct a matrix of block transform coefficients for the target block from the spatial vector. In one embodiment, this is done by first setting all the coefficients to zero. Then, the values of the coefficients from the spatial vector S are restored in the matrix at their previous locations. Because $N_c$ coefficients are restored, the result is a matrix Ĉ'. The matrix locations of the coefficients can be input to the method as a system parameter at 522, as discussed above.

At 570, inversely quantize each coefficient in Ĉ' (the quantization function can be input to the method as a system parameter at 517, as discussed above), to produce coefficient matrix Ĉ. At 575, an inverse transform is performed on Ĉ. The result is the spatial reference block X̂, which is used to predict original target block X.

At 580, if the spatial prediction method needs to be performed for another target block, the process repeats by returning to 510. Otherwise, the process ends at 590.

The method illustrated in FIG. 5 produces a spatial reference block and its corresponding spatial vector having an architecture and functionality that are similar to those of a temporal reference block and motion vector. For example, a temporal reference block is identified by its motion vector, and a spatial reference block is constructed from its spatial vector. The spatial vector created by the method of FIG. 5 has a number of elements that are similar to the number of elements in a motion vector. With a similar number of elements, the encoding cost of each vector, which is number of bits needed to encode the vector, can be neglected when deciding which prediction method to apply to a target block. Therefore, an encoding decision can be easily made by comparing the prediction errors of the two prediction blocks.

An example of performing spatial prediction using the method of FIG. 5 is now discussed. In this example, let a target block have a 4×4 size, e.g., it has 4 rows and 4 columns of pixels. In general, the DCT can be applied to a rectangular block of any size, e.g, 8×8 or 4×8. Let X be the matrix of original pixel values of the target block (data obtained from a real image), which in this example is:

$$X = \begin{pmatrix} 197 & 165 & 127 & 105 \\ 154 & 124 & 98 & 73 \\ 139 & 117 & 84 & 56 \\ 123 & 98 & 67 & 35 \end{pmatrix}.$$

Apply a two-dimensional DCT transform on matrix X, to generate the following DCT coefficient matrix:

$$C = DCT(X) = \begin{pmatrix} 440.500 & 130 & 0.500 & 4.302 \\ 96 & 2.078 & 7.041 & -1.189 \\ 18.000 & 6.962 & 1.000 & -0.178 \\ 19.546 & 3.311 & -1.293 & -3.578 \end{pmatrix}.$$

Apply a quantization function to the DCT coefficients in C, e.g., divide each element in C by a value q, then round up to the nearest integer (q=10 in this example), $$C' = \text{Round}(C/q) = \begin{pmatrix} 44 & 13 & 0 & 0 \\ 10 & 0 & 1 & 0 \\ 2 & 1 & 0 & 0 \\ 2 & 0 & 0 & 0 \end{pmatrix}.$$

Set $N_c=3$, so that the spatial vector has 3 elements. The location of the 3 elements is in the upper-left corner. Then, select the 3 quantized coefficients in the upper-left corner in C'. In general, the number of coefficients $N_c$ as well as their locations, can be defined by a user as a free parameter. In this example, the selected coefficients in C' are 44, 13, 10.

Now, create the spatial vector for the target block using the selected coefficients:

S=[44, 13, 10].

All other elements in matrix C' are discarded.

To construct the spatial reference block, first create a coefficient matrix $\hat{C}'$ from the spatial vector S. This is done by (i) setting all the elements in $\hat{C}'$ to 0, and (ii) restoring the selected coefficients from the spatial vector S to their previous locations in the matrix:

$$\hat{C}' = \begin{pmatrix} 0 & 0 & 0 & 0 \\ 0 & 0 & 0 & 0 \\ 0 & 0 & 0 & 0 \\ 0 & 0 & 0 & 0 \end{pmatrix} \rightarrow \text{copy from } S \rightarrow \hat{C}' = \begin{pmatrix} 44 & 13 & 0 & 0 \\ 10 & 0 & 0 & 0 \\ 0 & 0 & 0 & 0 \\ 0 & 0 & 0 & 0 \end{pmatrix},$$

Then, perform an inverse quantization on the matrix $\hat{C}'$, e.g., multiply $\hat{C}'$ by q=10:

$$\hat{C} = \hat{C}' \times q = \begin{pmatrix} 440 & 130 & 0 & 0 \\ 100 & 0 & 0 & 0 \\ 0 & 0 & 0 & 0 \\ 0 & 0 & 0 & 0 \end{pmatrix},$$

Apply an inverse DCT on matrix $\hat{C}$, to produce pixel values for the spatial reference block $\hat{X}$, $$\hat{X} = \text{Inverse } DCT(\hat{C}) = \begin{pmatrix} 185 & 160 & 125 & 100 \\ 166 & 141 & 106 & 81 \\ 139 & 114 & 79 & 54 \\ 120 & 95 & 60 & 35 \end{pmatrix},$$

The pixel values in the spatial reference block $\hat{X}$ are used to predict the pixel values for the target block X. The spatial prediction error is the actual pixel values for the target block, minus the predicted pixel values:

$e=X-\hat{X},$ which in this case is:

$$e = \begin{pmatrix} 197 & 165 & 127 & 105 \\ 154 & 124 & 98 & 73 \\ 139 & 117 & 84 & 56 \\ 123 & 98 & 67 & 35 \end{pmatrix} - \begin{pmatrix} 185 & 160 & 125 & 100 \\ 166 & 141 & 106 & 81 \\ 139 & 114 & 79 & 54 \\ 120 & 95 & 60 & 35 \end{pmatrix}$$

$$= \begin{pmatrix} 12 & 5 & 2 & 5 \\ -12 & -17 & -8 & -8 \\ 0 & 3 & 5 & 2 \\ 3 & 3 & 7 & 0 \end{pmatrix}.$$

The spatial predictive encoding method can replace a conventional intra-coding method in video compression applications. Its integration with temporal predictive coding produces an Integrated Spatial Temporal Predictive Encoding method, which can be applied to encode an entire sequence of images in video compression applications, e.g., MPEG.

Figure 6:
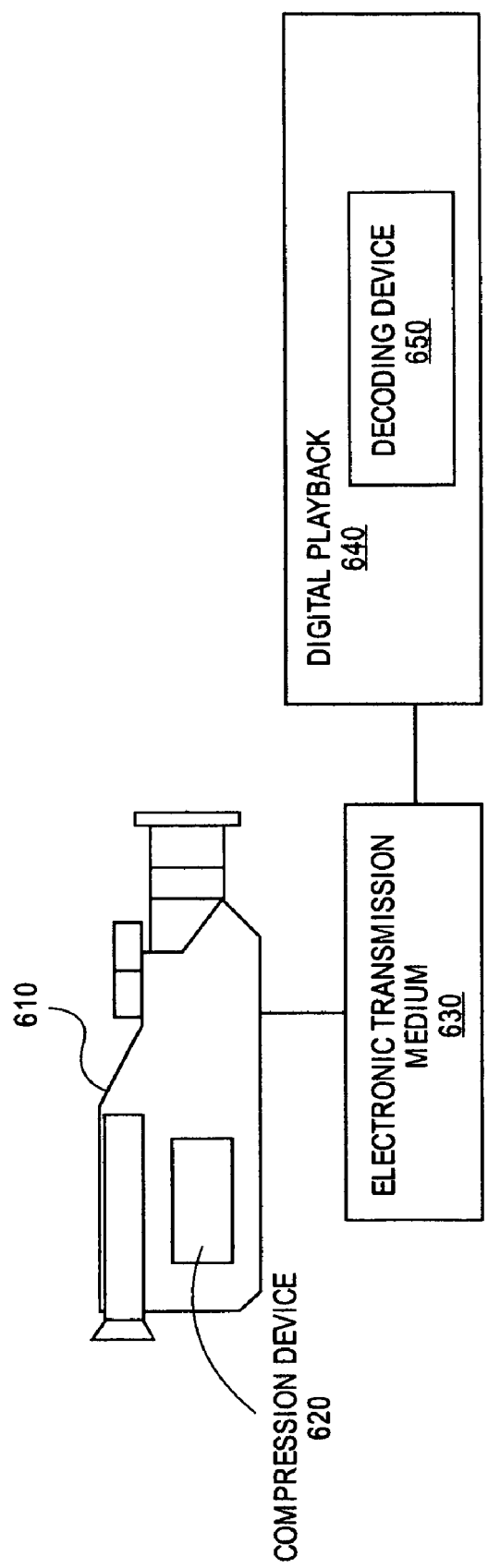
FIG. 6 shows an example of a system that uses the ISTPE method.

FIG. 6 shows an example of a system that uses the ISTPE method. A digital video camera 610 captures images in an electronic form, and processes the images using compression device 620, which implements the ISTPE method during the compression and encoding process. The encoded images are sent over an electronic transmission medium 630 to digital playback device 640. The images are decoded by decoding device 650, which uses the ISPTE method during the decoding process. Camera 610 is illustrative of various image processing apparatuses (e.g., other image capture devices, image editors, image processors, personal and commercial computing platforms, etc.) that include embodiments of the invention. Likewise, decoding device 650 is illustrative of various devices that decode image data.

While the invention is described in terms of illustrative embodiments in a specific system environment, those of ordinary skill in the art will recognize that the invention can be practiced in various ways in other and different hardware and software environments within the spirit and scope of the appended claims.

The invention claimed is:

1. A method comprising:
    generating, by a data processing system, a spatial vector for a target block of pixels, wherein the generating comprises performing a discrete cosine transform spatial prediction method comprising selecting a number of quantized coefficients as elements of the spatial vector;
    using the spatial vector to generate a matrix of quantized discrete cosine transform coefficients;
    applying an inverse quantization function to the matrix of quantized discrete cosine transform coefficients to produce a matrix of discrete cosine transform coefficients;
    applying an inverse discrete cosine transform function to the matrix of discrete cosine transform coefficients to generate a spatial reference block having a matrix of pixel values;
    using the spatial reference block to generate a spatial prediction of the target block;
    generating a spatial prediction error;
    comparing the spatial prediction error to a temporal prediction error; and
    encoding the spatial reference block if the spatial prediction error is less than the temporal prediction error.

2. The method of claim 1, wherein the discrete cosine transform spatial prediction method further comprises:

generating a matrix of pixel values for the target block;

applying a discrete cosine transform function to the matrix to produce a discrete cosine transform coefficient matrix;

applying a quantization function to the discrete cosine transform coefficient matrix.

3. The method of claim 1, wherein using the spatial reference block to generate the spatial prediction of the target block comprises:

using the matrix of pixel values to predict values of the target block.

4. An apparatus comprising:

a spatial vector generator that generates a spatial vector for a target block of pixels, wherein the spatial vector generator comprises discrete cosine transform logic that performs a discrete cosine transform spatial prediction function and comprises a selection device that selects a number of quantized coefficients as elements of the spatial vector;

a spatial vector decoder that uses the spatial vector to generate a matrix of quantized discrete cosine transform coefficients;

an inverse guantization device that applies an inverse guantization function to the matrix of quantized discrete cosine transform coefficients to produce a matrix of discrete cosine transform coefficients;

an inverse discrete cosine transform devices that applies an inverse discrete cosine transform function to the matrix of discrete cosine transform coefficients to generate a spatial reference block having a matrix of pixel values;

a spatial predictor that uses the spatial reference block to generate a spatial prediction of the target block;

a prediction error generator that generates a spatial prediction error;

a comparator that compares the spatial prediction error to a temporal prediction error; and an encoder that encodes the spatial reference block if the spatial prediction error is less than the temporal prediction error.

5. The apparatus of claim 4, wherein said discrete cosine transform logic further comprises:

a matrix generator that generates a matrix of pixel values for the target block;

a discrete cosine transform coefficient generator that uses the matrix to produce a discrete cosine transform coefficient matrix;

a quantization device that applies a quantization function to the discrete cosine transform coefficient matrix.

6. The apparatus of claim 4, wherein said spatial predictor comprises:

a reference block decoder that uses the matrix of pixel values from the spatial reference block to predict pixel values of the target block.

7. A computer readable medium storing a program of instructions which, when executed by a processing system, cause the system to perform a method comprising:

generating a spatial vector for a target block of pixels, wherein the generating comprises performing a discrete cosine transform spatial prediction method comprising selecting a number of quantized coefficients as elements of the spatial vector;

using the spatial vector to generate a matrix of quantized discrete cosine transform coefficients;

applying an inverse guantization function to the matrix of quantized discrete cosine transform coefficients to produce a matrix of discrete cosine transform coefficients;

applying an inverse discrete cosine transform function to the matrix of discrete cosine transform coefficient to generate a spatial reference block having a matrix of pixel values;

using the spatial reference block to generate a spatial prediction of the target block;

generating a spatial prediction error;

comparing the spatial prediction error to a temporal prediction error; and encoding the spatial reference block if the spatial prediction error is less than the temporal prediction error.

8. The computer readable medium of claim 7, wherein the discrete cosine transform spatial prediction method comprises:

generating a matrix of pixel values for the target block;

applying a discrete cosine transform function to the matrix to produce a discrete cosine transform coefficient matrix;

applying a quantization function to the discrete cosine transform coefficient matrix.

9. The computer readable medium of claim 7, wherein using the spatial reference block to generate the spatial prediction of the target block comprises:

using the matrix of pixel values to predict pixel values of the target block.

* * * * *

UNITED STATES PATENT AND TRADEMARK OFFICE
CERTIFICATE OF CORRECTION

PATENT NO. : 7,620,108 B2  Page 1 of 1
APPLICATION NO. : 11/228599
DATED : November 17, 2009
INVENTOR(S) : Miao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 984 days.

Signed and Sealed this

Twenty-sixth Day of October, 2010

David J. Kappos
*Director of the United States Patent and Trademark Office*